July 20, 1954 W. O. McFARLAND 2,683,933
MEASURING DEVICE
Filed Feb. 18, 1950
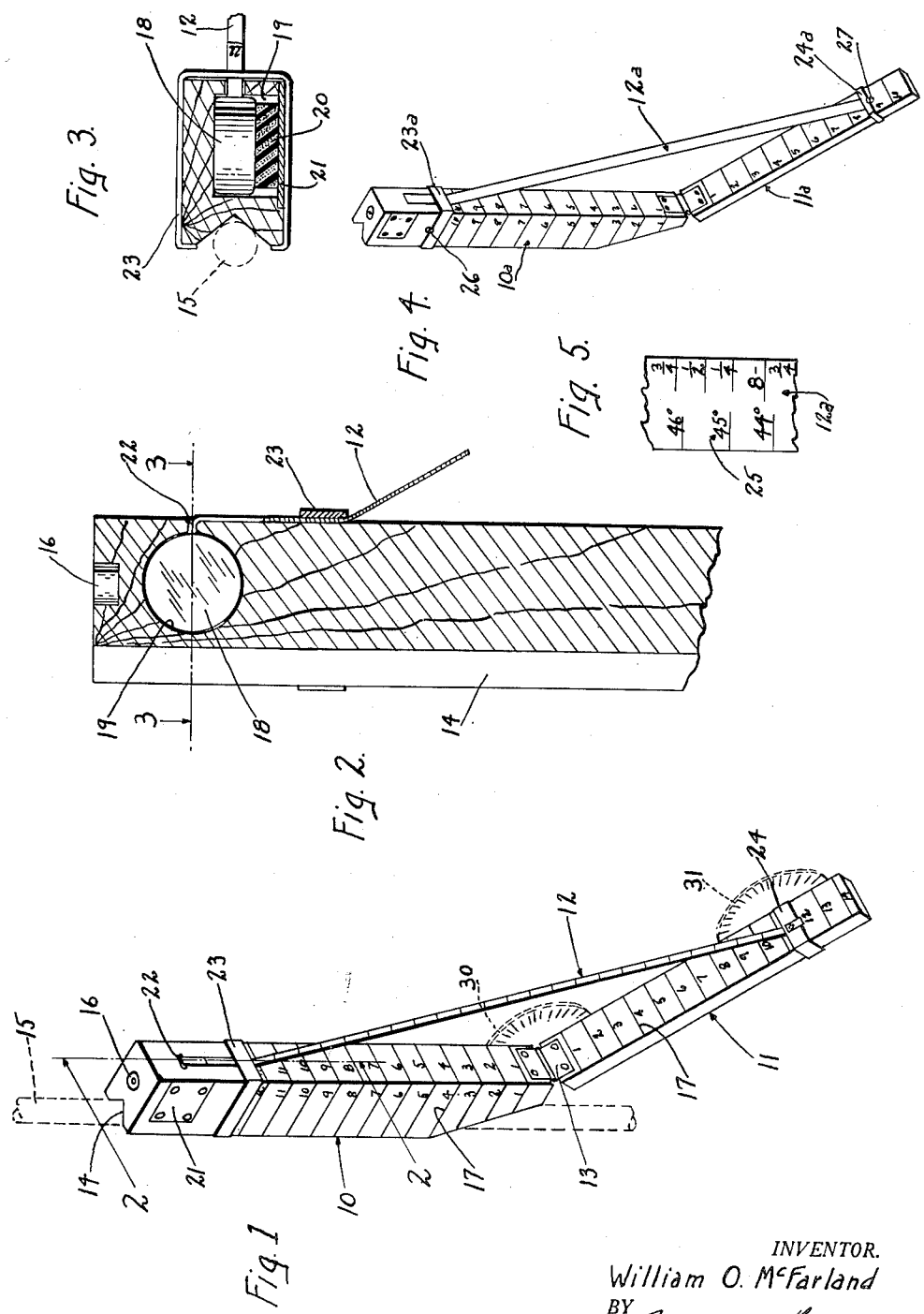
INVENTOR.
William O. McFarland
BY
ATTORNEY Patented July 20, 1954

2,683,933

UNITED STATES PATENT OFFICE 2,683,933

MEASURING DEVICE

William O. McFarland, Newton Falls, Ohio

Application February 18, 1950, Serial No. 145,045

3 Claims. (Cl. 33—98)

My invention relates to measuring devices, more particularly to devices which will provide for direct reading of the length of any leg of an angular geometric figure and also the angle between any of the legs, and the principal object of my invention is to provide new and improved devices of this character.

It will be appreciated that a device that provides for direct reading of the length of any triangle leg and/or the angular relationship of such legs has many uses. One use which is herein particularly pointed out is in the installation of television antennas. Heretofore, considerable guess-work was involved in antenna installation, particularly with respect to measurement of guy wires. As a consequence, the installation workman either provided more than ample length of guy wire, resulting in waste, or the length of wire allotted was too short, and undesirable splicing of additional wire thereto was required.

Through use of my device, the exact length of guy wire may be accurately determined without necessity of complicated calculations, or measurement of lengths frequently found difficult because of precarious conditions surrounding the installation of an antenna.

In the drawing accompanying this specification and forming a part of this application there is shown, for purposes of illustration, embodiments which my invention may assume, and in this drawing:

Figure 1 is a perspective view of a device embodying my invention, an antenna upright being shown in dotted lines, Figure 2 is an enlarged, fragmentary sectional view corresponding generally to the line 2—2 of Figure 1.

Figure 3 is a transverse sectional view corresponding generally to the line 3—3 of Figure 2, Figure 4 is a perspective view of a slightly different embodiment of my invention, and Figure 5 is an enlarged, fragmentary view of a portion of the tape used in Figure 4.

My invention provides an instant reading of measurement of a side or angle of an angular geometric figure, and particularly a triangular figure. Generally, my invention comprises the provision of parts which simulate the legs or sides of a geometric figure, the parts being so connected that they may assume various angular and linear relations with respect to each other.

In the embodiments herein disclosed two members 10 and 11 are connected together so that they may assume various angular relationship. A means 12 is connectable to the members 10 and 11 so that the combination simulates respective legs of a triangle, the connection being such that the length of any triangle leg and the angular relationship of the legs may be readily changed.

In the presently disclosed embodiment, adjoining ends of the members 10 and 11 are connected for pivotal movement, as by means of a hinge 13. For television antenna installation use, or like use, the member 10 is preferably of greater cross-section than the member 11, and is formed with a longitudinal groove 14 into which may be disposed an adjoining length of the antenna upright 15. The antenna upright may be disposed within the groove 14 during measurement operations or for the purpose of determining whether or not the upright is in exact vertical position, the latter determination being made possible by a level indicating device, such as the button level 16, mounted in the top of the member 10.

Each of the members 10 and 11 is preferably provided with linear measurement indications 17, the character of such indications depending upon the size of the device. Thus, the indications may be in inches or feet, or centimeters or meters. Since it is preferable to provide a small size device so that it may be easily carried in a pocket or tool-box of a user, the indications 17 are preferably of a proportional nature with respect to large size measurements. Thus, the indications 17 may be progressively numbered, starting from the hinge 13, each indicating, for example, one foot.

The means 12 is preferably flexible so that its length may be readily changed. For this purpose a flexible tape has been found suitable, the tape being either of fabric or thin metal, or any other suitable flexible material. In the presently disclosed embodiment, it has been found preferable to use a roll-type tape, that is, a flexible tape which is wound, either by spring or manually, on a roll carried within a suitable case 18. Roll-type tapes of this kind are well known in the art and detailed description thereof is believed unnecessary.

As best seen in Figures 2 and 3, the upper end of the member 10 is formed with a cylindrical recess 19 of a size to closely receive the cylindrical case 18. Any suitable means may be used to hold the case 18 against rotation. For example, the case may have a press fit with the walls of the recess 19, or the recess and case may have corresponding non-circular outlines. In the presently disclosed embodiment, a block of friction inducing material, such as rubber 20, is compressed between a surface of the case 18 and a removable cover plate 21.

The member 10 is provided with a slot 22 through which the leading end of the tape 12 may be threaded so as to be in position for use. Each member 10 and 11 has slide means slidably longitudinally thereof, and in the presently disclosed embodiment such slide means comprises slide clips 23, 24 respectively embracing the members 10 and 11.

The leading end of the tape 12 is also threaded between the clip 23 and the adjoining surface of the member 10 and has its terminal portion connected to the slide clip 24 in any suitable manner, such as by providing an eye at this terminal portion and engaging it with a projection or finger on the slide clip 24.

From the foregoing description, it will be readily seen that the members 10 and 11 may be moved to any desired angular relationship, the tape 12 being extended from or rolled-up on the roll as is necessary. The slide clips 23 and 24 may be moved to any desired position along their respective members 10 and 11 to provide for predetermined length of the triangle leg formed by such member. The tape 12 is also provided with linear measurement indications which preferably correspond to the type of indications formed on the members 10 and 11.

In use, and with particular reference to installation of a television antenna, the user may predetermine the height of the guy wire connection to the mast from a supporting surface for the mast, such as the roof. He then sets the slide clip 23 to position along the member 10 to correspond to such height.

The lateral distance from the mast to the point of connection of the lower end of the guy wire to a supporting surface (such as the roof) is then determined, as by measurement, and the slide clip 24 is moved along the member 11 to correspond to such length.

Then the user may place the leg 11 on the sloping surface of the roof, either adjacent to the mast or removed therefrom (assuming that the slope at either place is substantially the same), or if the slope is known, the leg 11 may be moved to correct angularity as determined by a protractor device, and with the member in vertical position (determined by a reading of the button level 16) the length of the leg simulated by the tape 12, from the clip 24 to the clip 23, is read. This reading gives the exact length of the guy wire, from mast connection to roof connection. Thus, it is only necessary to allow sufficient extra length for connection purposes, and such extra length can be accurately determined by experience.

If desired, a protractor 30 (shown in dotted lines in Figure 1) may be connected to one of the members 10, 11, at the hinge point 13 and in position so that it is slidable along a side surface of the other leg, whereby it is possible to directly read the angularity of the members 10, 11 at all times.

Further, if desired, a protractor may be fixed to either one or both of the slide clips 23, 24 for movement therewith, whereby the angularity of the flexible tape 12 with respect to the respective member may be read at all times. In Figure 1, a protractor 31 is shown in dotted lines, this protractor being fixed to the slide clip 24 and movable therewith. To provide for accuracy in reading, the connection of the tape 12 at the slide clip 24 may be shifted adjacent to the face of the protractor 31 so that the tape is movable over the protractor surface.

The member 11 may also be provided with a level device means (not shown) to indicate when this member is horizontal and/or vertical, so that either member 10 or 11 may be used as the upright member.

The embodiment of the invention disclosed in Figures 4 and 5 is somewhat similar to that previously described and like parts are identified by like reference numerals. In this embodiment, the tape 12a, in addition to the linear measurement indications, is provided with angular measurement indications 25. Such measurements, like the linear measurements, start from zero at the terminal end of the tape, that is the end which is secured to the slide clip 24a.

Reference points, such as pins 26 and 27, are disposed at fixed positions on respective members 10a and 11a, thus providing triangle legs of a known length. Thus, any change in angle between such legs of fixed size will be reflected in a change in length of the leg 12a. It will be appreciated that trigonometric calculation will enable one to properly calibrate the tape 12a in angular measurement indications, so that with the slide clips 23a, 24a at reference points 26, 27, any angle between the members 10a and 11a may be quickly read on the tape. Also, the length of the leg 12a may be read as a result of the linear measurements on the tape.

In view of the foregoing, it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A measuring device, comprising: a pair of members pivoted together so that they may assume various angular relations; slide means slidable along each of said members; and a roll-type flexible tape carried by one of said members, the extended end of said tape passing between one of said members and its respective slide means and having its terminal portion secured to the slide means on the other of said members.

2. A measuring device, comprising: a pair of members pivoted together so that they may assume various angular relations, each of said members having linear measurement indications thereon; slide means slidable along each of said members; and a roll-type flexible tape having linear measurement indications thereon, said members and said tape being cooperable to simulate the legs of a triangle, the roll of said tape being carried by one of said members and having an extended tape portion threaded between this member and the respective slide means, and the terminal portion of said extended tape portion being connected to the slide means on the other of said members.

3. A measuring device, comprising: a pair of members pivoted together so that they may assume various angular relations, each of said members having linear measurement indications thereon; slide means slidable along each of said members; and a roll-type flexible tape having linear measurement indications and corresponding angular measurement indications thereon, said members and said tape being cooperable to simulate the legs of a triangle, the roll of said tape being carried by one of said members and having an extended tape portion threaded between this member and the respective slide means, and the terminal portion of said extended tape portion being connected to the slide means on the other of said members.

References Cited in the file of this patent

UNITED STATES PATENTS

| Number | Name | Date |
|---|---|---|
| 759,313 | Roe | May 10, 1904 |
| 1,022,969 | Ohye | Apr. 9, 1912 |
| 1,849,128 | Wood | Mar. 15, 1932 |
| 2,093,048 | Ike | Sept. 14, 1937 |

FOREIGN PATENTS

| Number | Country | Date |
|---|---|---|
| 39,160 | Switzerland | Feb. 28, 1907 |
| 197,045 | Germany | Apr. 4, 1908 |
| 28,921 | France | Jan. 12, 1925 |
| 573,150 | Germany | Mar. 28, 1933 |